(12) United States Patent
Wolfe

(10) Patent No.: US 6,591,617 B2
(45) Date of Patent: Jul. 15, 2003

(54) METHOD AND APPARATUS FOR HYDROGEN STORAGE AND RETRIEVAL

(75) Inventor: James Douglas Wolfe, Colleyville, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/113,261

(22) Filed: Apr. 1, 2002

(65) Prior Publication Data

US 2003/0037551 A1 Feb. 27, 2003

Related U.S. Application Data

(60) Provisional application No. 60/314,132, filed on Aug. 22, 2001.

(51) Int. Cl.⁷ .......................... F17C 11/00; F17C 13/02; F17C 7/04; F17C 3/00
(52) U.S. Cl. .......................... 62/46.3; 62/49.1; 62/48.1; 220/560.04
(58) Field of Search ................. 62/46.3, 49.1, 62/48.1; 96/117.5, 126; 95/901; 220/586, 501, 560.08, 590, 560.04; 423/439

(56) References Cited

U.S. PATENT DOCUMENTS

| | | | | |
|---|---|---|---|---|
| 3,950,960 A | * | 4/1976 | Kawam | 62/46.3 |
| 4,343,770 A | * | 8/1982 | Simons | 422/112 |
| 4,383,606 A | * | 5/1983 | Hunter | 206/0.7 |
| 4,756,163 A | * | 7/1988 | Garg | 62/46.3 |
| 5,261,764 A | * | 11/1993 | Walles | 405/52 |
| 5,512,087 A | * | 4/1996 | Varner et al. | 96/133 |
| 5,653,951 A | * | 8/1997 | Rodriguez et al. | 423/439 |
| 6,015,065 A | * | 1/2000 | McAlister | 220/586 |
| 6,315,977 B1 | * | 11/2001 | Cantacuzene | 423/651 |
| 6,341,572 B1 | * | 1/2002 | Howell et al. | 114/230.12 |
| 6,432,176 B1 | * | 8/2002 | Klos et al. | 96/117.5 |

* cited by examiner

Primary Examiner—William C. Doerrler
(74) Attorney, Agent, or Firm—Bracewell & Patterson, L.L.P.

(57) ABSTRACT

A method is provided for delivering gaseous hydrogen to end users, the hydrogen being delivered in reusable storage tanks containing a plurality of carbon nanotubes. Liquid hydrogen is introduced into the tank, and the nanotubes absorb the hydrogen. The tanks are then warmed to normal temperatures and distributed to end users. The tanks are connected to the end-user system and are preferably installed within an air-tight enclosure, which may have an inert atmosphere. Alternatively, an inerting system monitors the air within the enclosure for free hydrogen and can release an inerting gas if free hydrogen is detected. The hydrogen is selectively released by heating the storage tank or by injecting a catalyst into the tank. When the usable hydrogen is depleted, the tank is retrieved from the end user for refurbishment and refilling.

29 Claims, 4 Drawing Sheets

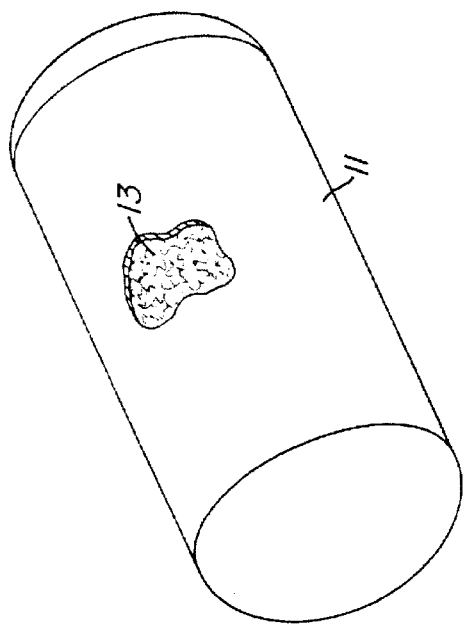
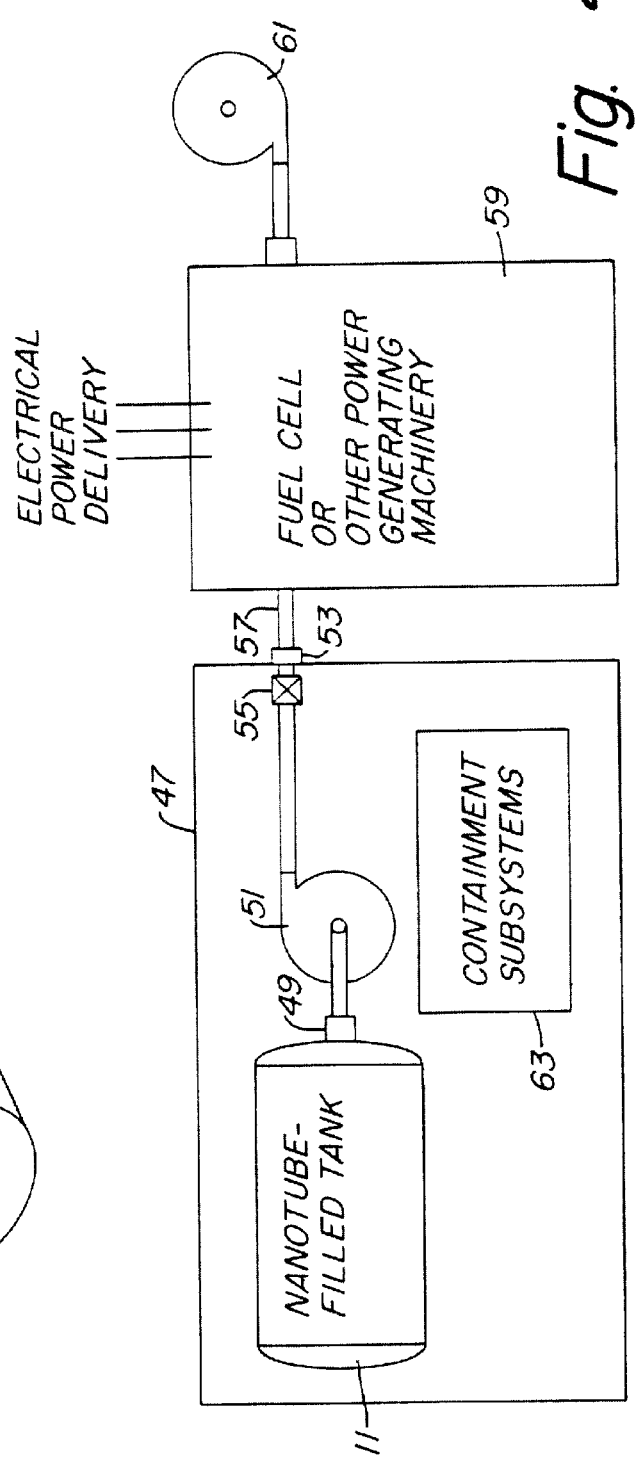

METHOD AND APPARATUS FOR HYDROGEN STORAGE AND RETRIEVAL

CROSS-REFERENCE TO RELATED APPLICATIONS

Benefit is herein claimed of the filing date under 35 USC §119 and/or §120 and CFR 1.78 to U.S. Provisional Patent Application Ser. No. 60/314,132, filed on Aug. 22, 2001, entitled "Method and Process for Hydrogen Storage and Retrieval."

BACKGROUND OF THE INVENTION

1. Field of the Invention

The present invention relates generally to processing of hydrogen and relates specifically to a method for storing and retrieving hydrogen for use in consumer applications.

2. Description of the Related Art

Gaseous hydrogen as a fuel for combustion or for oxidation has many advantages. In a combustion process, hydrogen burns cleanly and without the polluting emissions of burning hydrocarbons. Additionally, hydrogen may be used in fuel cells to produce an electrical current, providing electricity for consumer use or for powering motors for use in automobiles.

Hydrogen is available in storage tanks as a compressed gas. However, the amount of hydrogen that can safely stored in these tanks is limited. Also, gaseous hydrogen is highly flammable, and the small size of hydrogen atoms makes controlling leaks difficult.

Liquid hydrogen is used in the aerospace industry to provide a larger amount of hydrogen for a given storage volume, but this is only practical for limited, high-cost applications. Storage tanks and plumbing have to be specially designed to withstand and maintain the extreme temperatures of liquid hydrogen. Also, special handling is required that would not be conducive to a consumer product.

Carbon nanotubes are three-dimensional, tube-shaped structures formed by carbon atoms arranged in hexagonal patterns. Nanotubes may have single-wall thickness or may comprise multiple nested nanotubes. It is known that carbon nanotubes have an affinity for hydrogen and can store hydrogen atoms in pores on the surface of the tubes and within the tube structures, allowing for more hydrogen atoms to be stored in a volume than can be stored with the hydrogen as a compressed gas.

BRIEF SUMMARY OF THE INVENTION

A method is provided for delivering gaseous hydrogen to end users, the hydrogen being delivered in reusable storage tanks containing a plurality of carbon nanotubes. Liquid hydrogen is introduced into the tank, and the nanotubes absorb the hydrogen. The tanks are then warmed to normal temperatures and distributed to end-user. The tanks are connected to the end-user system and are preferably installed within an airtight enclosure, which may have an inert atmosphere. Alternatively, an inerting system monitors the air within the enclosure for free hydrogen and can release an inerting gas if free hydrogen is detected. The hydrogen is selectively released by heating the storage tank or by injecting a catalyst into the tank. When the usable hydrogen is depleted, the tank is retrieved from the end user for refurbishment and refilling.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

FIG. 1 is a perspective view of a storage tank constructed in accordance with the present invention.

FIG. 4 is a schematic view of an end-user installation of the tank of FIG. 1.

DETAILED DESCRIPTION OF THE INVENTION

FIG. 1 shows a low-pressure tank 11 for storing and distributing hydrogen to consumers. Each tank 11 is preferably a pressure vessel containing carbon nanotubes 13, which may be a random bundle or may be oriented in layers and which fill substantially all of the free space within tank 11. Though shown as cylindrical, tanks 11 may be spherical or may have other shapes as desired or required for particular applications. Tanks 11 are preferably used to provide gaseous hydrogen for combustion or for fuel cells used in powering automobiles or residential electrical generators. In the process of the invention, the consumer obtains a charged tank for installation and use, the consumer attaching connectors (not shown) on tank 11 to corresponding connectors at the installation location. After the usable hydrogen is used, the consumer then returns a discharged tank and obtains a charged tank.

Tanks 11 may be constructed of conventional materials or of composite materials, as tanks 11 will be subjected to low pressures, such as 100 psi to 200 psi. Internal monitoring units (not shown) are preferably installed within tanks 11 for monitoring internal environmental conditions, such as pressure, temperature, and other internal characteristics. Also, elements (not shown) used to cause release of the hydrogen at a desired rate are installed within tanks 11, for example, replaceable heating elements that may be used to heat the hydrided nanotubes 13. Other methods of release may include introduction of a catalyst or mechanical agitation.

Figure 2:
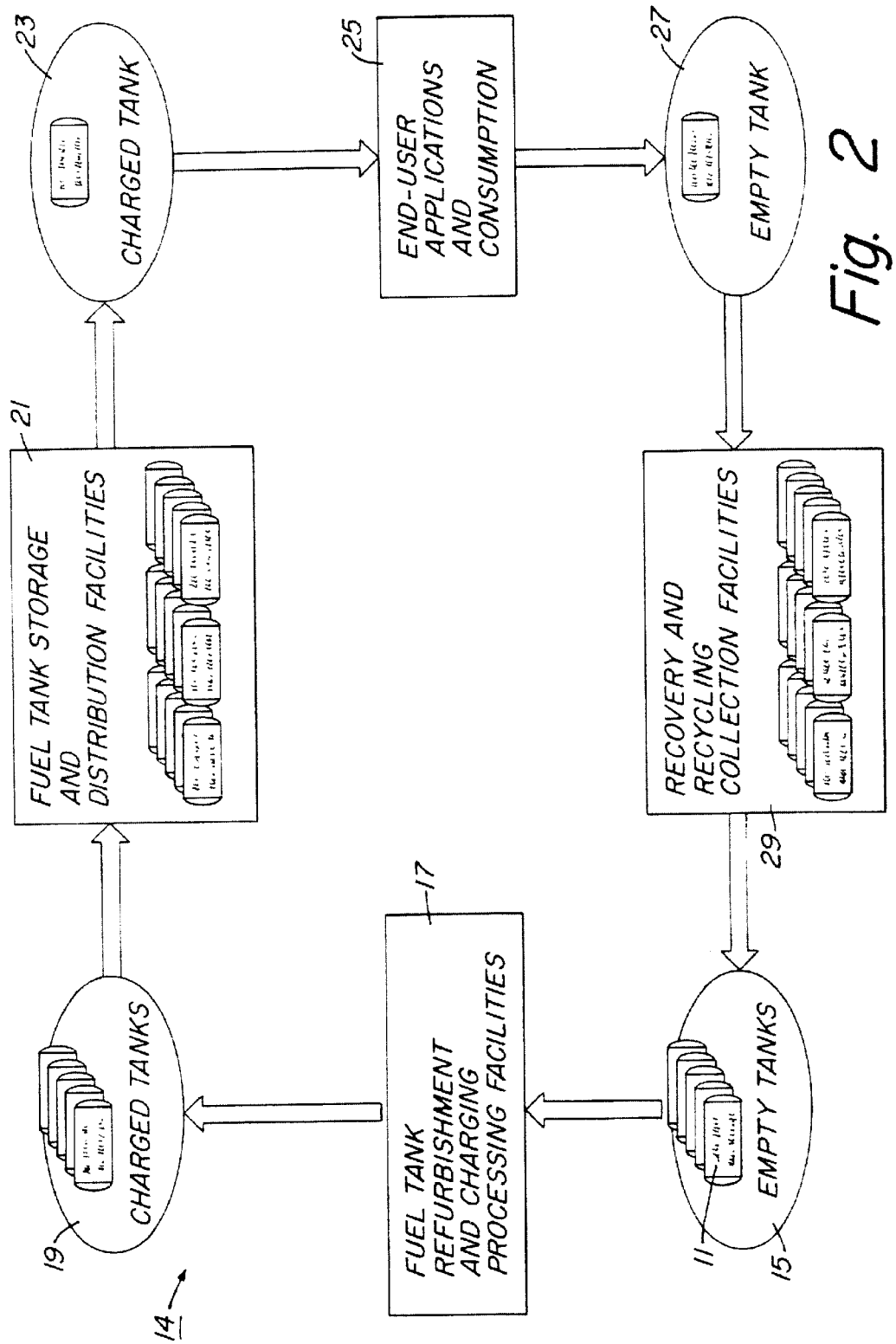
FIG. 2 is a flowchart depicting the method of the invention.

FIG. 2 shows a distribution cycle 14 for hydrogen fuel tanks 11 for consumer use. Steps 15 through 29 in cycle 14 provide for the processing and recovery of tanks 11 from the initial filling to collection of residual hydrogen.

Empty tanks 11 are acquired in step 15 for transport to a processing facility, tanks 11 being new or recovered after previous use. Tanks 11 are transported to the processing facility for the refurbishment and charging of tanks 11 in step 17 Tanks 11 may be refilled or may be refurbished, depending on the requirements of the selected process, individual tank condition, or intended application. In the basic process, the nanotube material within tanks 11 is recharged with hydrogen, the remaining parts of tanks 11 being unaffected. After charging, tanks 11 are collected in step 19 for transport to storage facilities.

In step 21, tanks 11 are stored at and distributed from facilities that are preferably located geographically near the user locations. These facilities may be located at the processing facility of step 17 or may be at other locations. Tanks 11 are transported from the storage facility in step 23 to be used by the consumer in step 25.

Step 27 is the transport of discharged tanks 11 to recovery and recycling collection facilities in step 29. The collection facilities would preferably function as an intermediate step in the collection of discharged tanks 11, several collection facilities collecting tanks 11 for shipment in step 15 to the processing facility of step 17. The collection facilities may perform recovery of residual hydrogen from returned tanks 11 and may disassemble tanks 11 that have reached the end of their service life.

Figure 3:
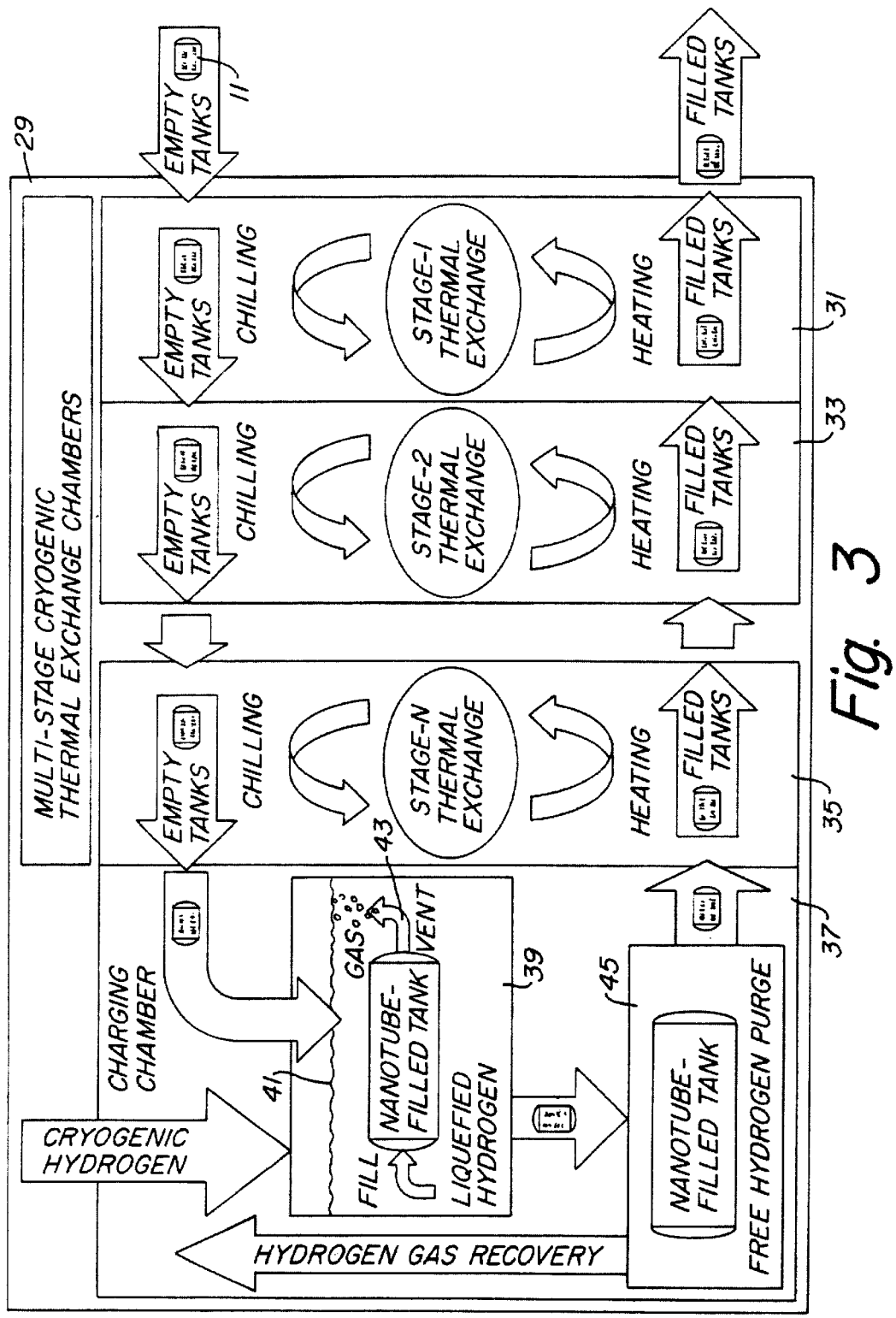
FIG. 3 is a flowchart detailing a step in the chart of FIG. 2.

FIG. 3 illustrates elements for charging tanks 11 in a processing facility 29, such as in step 17 (FIG. 2). A multi-stage method is provided, in which discharged tanks 11 are cooled and charged with cryogenic hydrogen, then tanks 11 are warmed to a temperature allowing normal handing procedures.

New or discharged tanks 11 are introduced to the first of a plurality of thermal-exchange chambers 31, 33, 35 within facility 29. Chambers 31, 33, 35 each contain an apparatus (not shown) for providing thermal exchange between warm, discharged tanks 11 being introduced into facility 29 and colder, charged tanks 11 being moved out of facility 29 for use. In addition to exchanging heat between tanks 11, the thermal-exchange apparatus will be a powered unit that operates a refrigeration cycle to further cool discharged tanks 11 and transfer the heat to charged tanks 11. To maximize efficiency, it is preferable to provide multiple chambers 31, 33, 35 for cooling tanks 11. Though shown in FIG. 3 as having three chambers 31, 33, 35, facility 29 may have more or fewer chambers 31, 33, 35.

After passing through chamber 31, discharged tanks pass into chamber 33, then into chamber 35 and into charging chamber 37. The temperature of tanks 11 as they pass from chamber 35 into charging chamber 37 is preferably below the boiling temperature of hydrogen.

In the embodiment shown, tank 11 is placed in a cryogenic chamber 39 containing liquid hydrogen 41, which enters tank 11 through openings (not shown) on tank 11. Tanks 11 may alternatively be infused with liquid hydrogen 41 through tubing connected directly to tanks 11. A vent 43 provides for gaseous hydrogen to escape from tank 11 and allows for a flow of liquid hydrogen 41 through tank 11. Tank 11 remains in cryogenic chamber 39 for a sufficient time to allow the nanotubes to absorb the maximum amount of hydrogen.

After allowing time for the nanotubes to fill, tank 11 is transferred to a purge chamber 45, and gaseous hydrogen is purged from within and around tank 11 and recovered to be re-liquefied. Tank 11 is then moved into the heating portion of chamber 35 to begin raising the temperature of tank 11. Tank 11 moves from chamber 35 into chamber 33, then into chamber 31, each chamber raising the temperature of tank 11 higher than the previous chamber 31, 33, 35. When charged tank 11 exits chamber 31, the temperature of tank 11 is approximately that of the ambient air. At this point, corresponding to step 19 (FIG. 2), charged tanks 11 are ready to be transported to a storage and distribution facility. Preferably, tank 11 will not contain any free hydrogen at this point, as all of the hydrogen is absorbed in the carbon nanotubes.

Tanks 11 are used in consumer applications, such as that shown schematically in FIG. 4. Tank 11 is contained within an airtight containment enclosure 47 for containing hydrogen that leaks from tank 11 or other locations within enclosure 47. Though only one tank 11 is shown, multiple tanks may be connected to increase the flow rate or to increase the time between required tank changes. The atmosphere within enclosure 47 is sealed from the outside atmosphere and may comprise an inert gas, for example, nitrogen, preventing combustion of any free hydrogen that leaks into enclosure 47. Enclosure 47 may alternatively have an inerting system for releasing an inert gas or a controlled venting system (not shown) to release hydrogen at a rate and at a location that will limit the danger of accumulation and ignition of the vented hydrogen.

Adjustable valve 49 sealingly connects tank 11 to pump 51, which is sealingly connected to an outlet 53 on the exterior of enclosure 47 by adjustable valve 55. Valves 49, 55 are selectively adjusted to control the flow rate through outlet 53. A tube 57 connects outlet 53 to device 59, such as a fuel cell or combustion device, and pump 61 pumps ambient air into device 59 to provide oxygen. Subsystems 63 contain various monitoring and recovery controls, and these are visible in FIG. 5.

Figure 5:
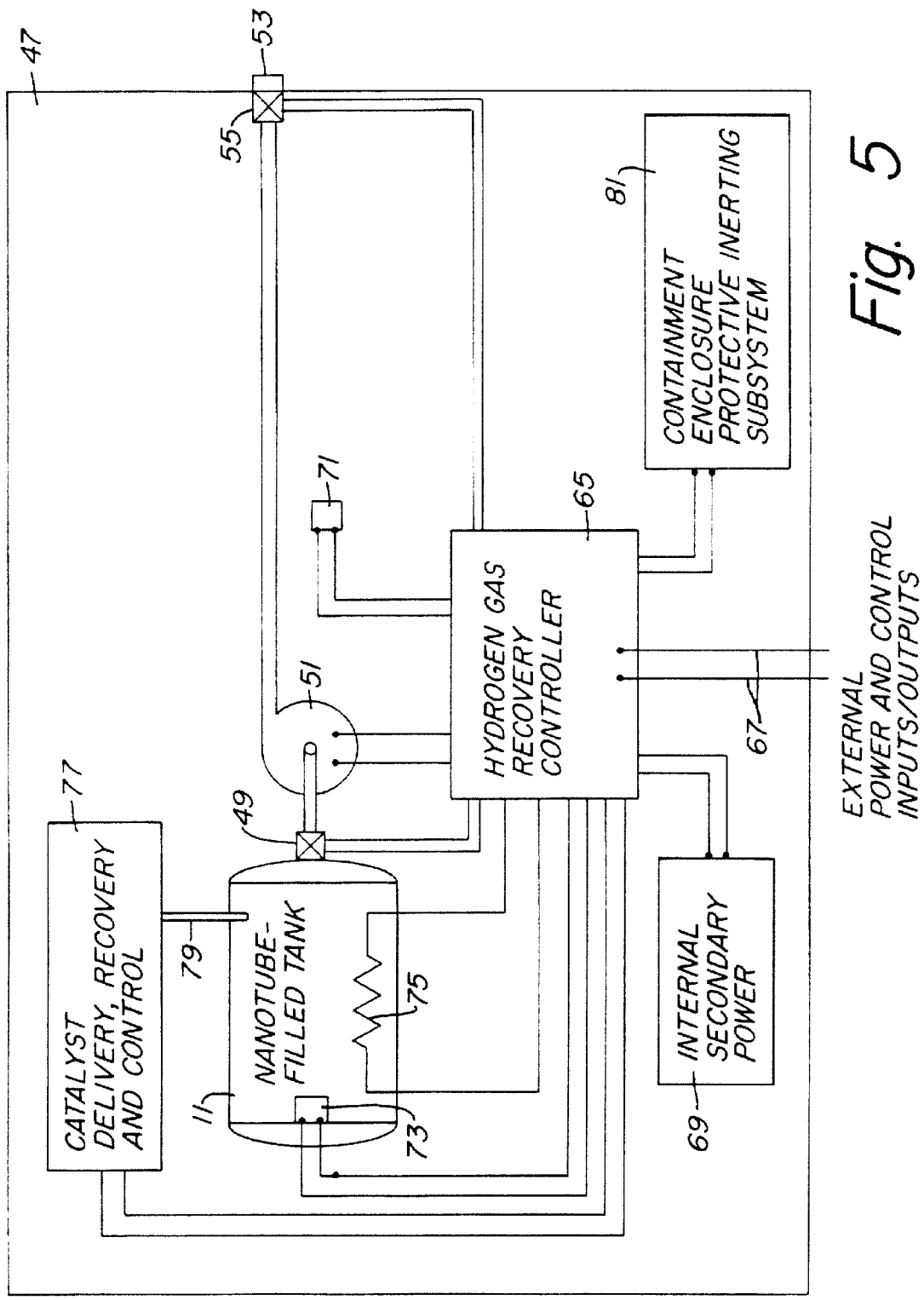
FIG. 5 is a schematic view of the subsystems of the installation of FIG. 4.

The components of subsystems 63 (FIG. 4) are shown in the schematic view of FIG. 5. Tank 11 is shown connected to valve 49 for providing hydrogen to pump 51. Pump 51 then pumps hydrogen through valve 55 to outlet 53. Though tank 11 and the enclosed carbon nanotubes are at ambient temperature, it may be necessary to affect the internal environmental or chemical conditions within tank 11 to release the hydrogen from tank 11.

Controller 65 is located within enclosure 47 and controls the functions of the subsystems. Cables 67 carry data and electrical power from external sources to controller 65. An internal power source 69 provides backup electrical power, ensuring continued function of the subsystems if external electrical power is lost.

Enclosure sensor 71 is located within enclosure 47 and measures environmental conditions within enclosure 47, including temperature and composition of the internal atmosphere, particularly the presence of free hydrogen. Tank sensor 73 is located within tank 11 and measures environmental conditions within tank 11. The tank conditions of interest may be temperature, pressure, and atmospheric composition. Controller 65 receives data from sensors 71, 73 and activates subsystems as required to produce hydrogen from tank 11 at a desired rate or to inert enclosure 47 if a leak is detected.

Controller 65 is connected with wires to a heating element 75 located in tank 11, heating element 75 being used to raise the internal temperature of tank 11 and the temperature of the nanotubes to cause the nanotubes to release the stored hydrogen at a higher rate. Additionally, controller 65 is wired to a catalyst control device 77 for injecting and recovering through port 79 a catalyst that also causes the nanotubes to release the hydrogen. Controller 65 can activate either heating element 75 or catalyst control device 77, or controller may activate both at once to provide the maximum production rate. Valves 49, 55 are connected to controller 65, controller 65 positioning valves 49, 55 to provide the desired flow rate through outlet 53. Flow rate sensors (not shown) are preferably located in valves 49, 55 or outlet 53 for measuring the flow rate of hydrogen.

Inerting system 81 is located within enclosure 47 and is connected to controller 65. Enclosure sensor 71 detects the composition of the atmosphere within enclosure 47. In this embodiment, inerting system 81 monitors sensor 71 to determine the presence of hydrogen that has leaked from tank 11 or from other components. If hydrogen is present, inerting system 81 releases an inert gas, preferably nitrogen, into enclosure 47 and may control a venting system (not shown) for controllably venting hydrogen outside of enclosure 47 at safe levels.

Many advantages are realized from using the present invention. The method provides a method of reliably providing end-users with charged hydrogen tanks and retrieving depleted tanks for refurbishment and recharging. The tanks are filled with hydrogen and distributed to the end-user, the tanks being sealed to prevent leakage. This eliminates the dangers of end-users having to fill the tanks themselves. The method provides for a continual supply of storage tanks in a supply loop from the processing facility to the consumer and back to the processing facility. The processing facility employs an efficient, multistage cooling system to cool the tanks prior to introduction of the liquid hydrogen, the system transferring heat from warmer tanks to cooler tanks.

While the invention has been shown in only one of its forms, it should be apparent to those skilled in the art that it is not so limited, but is susceptible to various changes without departing from the scope of the invention.

We claim:

1. A method of providing gaseous hydrogen to end users, the method comprising:
   (a) providing a plurality of storage tanks containing a plurality of carbon nanotubes;
   (b) introducing a volume of hydrogen into each storage tank, the hydrogen being absorbed into the nanotubes; then
   (c) then installing each storage tank within an air-tight enclosure, connecting the storage tanks to end-user systems and selectively releasing as a gas the hydrogen in the storage tanks for use in end-user applications;
   (d) monitoring the interior of the enclosure for free hydrogen; and releasing an inert gas within the enclosure if free hydrogen is detected.

2. The method of claim 1, further comprising after step (d):
   removing each of the storage tanks from the enclosure and retrieving the storage tanks from the end users; then
   repeating steps b through d.

3. The method of claim 1, wherein:
   step (a) comprises monitoring environmental conditions within each storage tank.

4. The method of claim 1, wherein:
   step (b) comprises introducing liquid hydrogen into each storage tank.

5. The method of claim 4, further comprising:
   after step (a) and before step (b), cooling the storage tanks to a temperature below the boiling temperature of hydrogen.

6. A method of providing gaseous hydrogen to end users, the method comprising:
   (a) providing a plurality of storage tanks containing a plurality of carbon nanotubes;
   (b) introducing a volume of hydrogen into each storage tank, the hydrogen being absorbed into the nanotubes;
   (c) connecting the storage tanks to end-user systems and selectively releasing as a gas the hydrogen in the storage tanks for use in end-user applications;
   wherein step (b) comprises introducing liquid hydrogen into each storage tank;
   after step (a) and before step (b), cooling the storage tanks to a temperature below the boiling temperature of hydrogen; and wherein:
   the storage tanks are cooled in successive chambers, each subsequent chamber cooling the tanks to a temperature below that of the previous chamber.

7. The method of claim 1, further comprising:
   after step (a) and before step (b), cooling the storage tanks to a temperature below the boiling temperature of hydrogen; and
   after step (b) and before step (c), warming the storage tanks to a temperature higher than the boiling temperature of hydrogen.

8. A method of providing gaseous hydrogen to end users, the method comprising:
   (a) providing a plurality of storage tanks containing a plurality of carbon nanotubes;
   (b) introducing a volume of hydrogen into each storage tank, the hydrogen being absorbed into the nanotubes;
   (c) connecting the storage tanks to end-user systems and selectively releasing as a gas the hydrogen in the storage tanks for use in end-user applications;
   after step (a) and before step (b), cooling the storage tanks to a temperature below the boiling temperature of hydrogen;
   after step (b) and before step (c), warming the storage tanks to a temperature higher than the boiling temperature of hydrogen; and
wherein:
   the storage tanks are cooled and warmed in successive chambers, each chamber transferring heat from warmer storage tanks to cooler storage tanks.

9. A method of providing gaseous hydrogen to end users, the method comprising:
   (a) providing a plurality of storage tanks containing a plurality of carbon nanotubes;
   (b) introducing a volume of hydrogen into each storage tank, the hydrogen being absorbed into the nanotubes;
   (c) connecting the storage tanks to end-user systems and selectively releasing as a gas the hydrogen in the storage tanks for use in end-user applications;
   (d) retrieving the storage tanks from the end users; then
   (e) repeating steps b through d; and
   after step (d) and before step (e), recovering unused hydrogen from within the storage tank.

10. The method of claim 1, wherein:
    step (c) comprises selectively heating the interior of each storage tank to cause release of the hydrogen from the nanotubes at a desired rate.

11. A method of providing gaseous hydrogen to end users, the method comprising:
    (a) providing a plurality of storage tanks containing a plurality of carbon nanotubes;
    (b) introducing a volume of hydrogen into each storage tank, the hydrogen being absorbed into the nanotubes;
    (c) connecting the storage tanks to end-user systems and selectively releasing as a gas the hydrogen in the storage tanks for use in end-user applications; and
    step (c) comprises selectively injecting a catalyst into each storage tank to cause release of the hydrogen from the nanotubes at a desired rate.

12. The method of claim 1, wherein:
    step (c) comprises installing each storage tank within an air-tight enclosure.

13. The method of claim 12, wherein:
step (c) comprises providing an inert atmosphere within the enclosure.

14. The method of claim 12, wherein:
step (c) comprises monitoring the interior of the enclosure for free hydrogen; and
releasing an inert gas within the enclosure when free hydrogen is detected.

15. A method of providing gaseous hydrogen to end users, the method comprising:
(a) providing a plurality of storage tanks containing a plurality of carbon nanotubes;
(b) cooling the storage tanks to a temperature below the boiling temperature of hydrogen;
(c) introducing a volume of liquid hydrogen into each storage tank, the hydrogen being absorbed into the nanotubes;
(d) connecting the storage tanks to end-user systems and selectively releasing as a gas the hydrogen in the storage tanks for use in end-user applications;
(e) retrieving the storage tanks from the end users; then
(f) repeating steps b through e.

16. The method of claim 15, wherein:
step (a) comprises monitoring environmental conditions within each storage tank.

17. A method of providing gaseous hydrogen to end users, the method comprising:
(a) providing a plurality of storage tanks containing a plurality of carbon nanotubes;
(b) cooling the storage tanks to a temperature below the boiling temperature of hydrogen;
(c) introducing a volume of liquid hydrogen into each storage tank, the hydrogen being absorbed into the nanotubes;
(d) connecting the storage tanks to end-user systems and selectively releasing as a gas the hydrogen in the storage tanks for use in end-user applications;
(e) retrieving the storage tanks from the end users; then
(f) repeating steps b through e; and wherein:
the storage tanks are cooled in successive chambers, each subsequent chamber cooling the tanks to a temperature below that of the previous chamber.

18. The method of claim 15, further comprising:
after step (c) and before step (d), warming the storage tanks to a temperature higher than the boiling temperature of hydrogen.

19. A method of providing gaseous hydrogen to end users, the method comprising:
(a) providing a plurality of storage tanks containing a plurality of carbon nanotubes;
(b) cooling the storage tanks to a temperature below the boiling temperature of hydrogen;
(c) introducing a volume of liquid hydrogen into each storage tank, the hydrogen being absorbed into the nanotubes;
(d) connecting the storage tanks to end-user systems and selectively releasing as a gas the hydrogen in the storage tanks for use in end-user applications;
(e) retrieving the storage tanks from the end users; then
(f) repeating steps b through e; and
after step (c) and before step (d), warming the storage tanks to a temperature higher than the boiling temperature of hydrogen; and wherein:
the storage tanks are cooled and warmed in successive chambers, each chamber transferring heat from warmer storage tanks to cooler storage tanks.

20. A method of providing gaseous hydrogen to end users, the method comprising:
(a) providing a plurality of storage tanks containing a plurality of carbon nanotubes;
(b) cooling the storage tanks to a temperature below the boiling temperature of hydrogen;
(c) introducing a volume of liquid hydrogen into each storage tank, the hydrogen being absorbed into the nanotubes;
(d) connecting the storage tanks to end-user systems and selectively releasing as a gas the hydrogen in the storage tanks for use in end-user applications,
(e) retrieving the storage tanks from the end users; then
(f) repeating steps b through e; and
after step (e) and before step (f), recovering unused hydrogen from within the storage tank.

21. The method of claim 15, wherein:
step (d) comprises selectively heating the interior of each storage tank to cause release of the hydrogen from the nanotubes at a desired rate.

22. A method of providing gaseous hydrogen to end users, the method comprising:
(a) providing a plurality of storage tanks containing a plurality of carbon nanotubes;
(b) cooling the storage tanks to a temperature below the boiling temperature of hydrogen;
(c) introducing a volume of liquid hydrogen into each storage tank, the hydrogen being absorbed into the nanotubes;
(d) connecting the storage tanks to end-user systems and selectively releasing as a gas the hydrogen in the storage tanks for use in end-user applications;
(e) retrieving the storage tanks from the end users; then
(f) repeating steps b through e; and
step (d) comprises selectively injecting a catalyst into each storage tank to cause release of the hydrogen from the nanotubes at a desired rate.

23. The method of claim 15, wherein:
step (d) comprises installing each storage tank within an air-tight enclosure.

24. The method of claim 23, wherein:
step (d) comprises providing an inert atmosphere within the enclosure.

25. A method of providing gaseous hydrogen to end users, the method comprising:
(a) providing a plurality of storage tanks containing a plurality of carbon nanotubes;
(b) cooling the storage tanks to a temperature below the boiling temperature of hydrogen;
(c) introducing a volume of liquid hydrogen into each storage tank, the hydrogen being absorbed into the nanotubes;
(d) connecting the storage tanks to end-user systems and selectively releasing as a gas the hydrogen in the storage tanks for use in end-user applications;
(e) retrieving the storage tanks from the end users; then
(f) repeating steps b through e; wherein
step (d) comprises installing each storage tank within an air-tight enclosure; and
step (d) comprises monitoring the interior of the enclosure for free hydrogen; and releasing an inert gas within the enclosure when free hydrogen is detected.

26. A storage tank for providing gaseous hydrogen to end users, the tank comprising:

a sealed enclosure having an outlet;

a tank enclosing a plurality of carbon nanotubes, the nanotubes occupying substantially all of the free space within the tank, the tank being releasably mounted in the enclosure and having an outlet passage in fluid communication with the outlet of the enclosure and sealed from the interior of the enclosure;

a volume of hydrogen absorbed into the carbon nanotubes for storage, the hydrogen being selectively releasable as a gas from the tank through the outlet passage of the tank and the outlet of the enclosure;

a hydrogen gas detector having a sensor within the enclosure exterior of the tank for monitoring for any leakage of hydrogen gas from the tank to the interior of the enclosure; and an inerting device for injecting an inert gas into the interior of the enclosure around the tank in the event that hydrogen gas is detected.

27. The tank of claim 26, further comprising:

an electrical controller mounted in the enclosure for controlling the release of hydrogen through the outlet passage of the tank.

28. The tank of claim 27, further comprising:

a heating element in the tank for selectively heating the nanotubes to release the hydrogen from the nanotubes, the heating element being controlled by the controller.

29. A storage tank for providing gaseous hydrogen to end users, the tank comprising:

a tank enclosing a plurality of carbon nanotubes, the nanotubes occupying substantially all of the free space within the tank;

a volume of hydrogen absorbed into the carbon nanotubes for storage, the hydrogen being selectively releasable as a gas from the tank; and a catalyst-injection port in communication with the interior of the tank for selectively injecting a catalyst to release the hydrogen from the nanotubes.

* * * * *